(12) United States Patent
Pavlov

(10) Patent No.: US 9,830,482 B2
(45) Date of Patent: Nov. 28, 2017

(54) READ CYCLES FOR IDENTIFYING RFID TAGS

(71) Applicant: Deductomix, Inc., Cambridge, MA (US)

(72) Inventor: Elan Pavlov, Cambridge, MA (US)

(73) Assignee: Deductomix, Inc., Cambridge, MA (US)

( * ) Notice: Subject to any disclaimer, the term of this patent is extended or adjusted under 35 U.S.C. 154(b) by 0 days.

(21) Appl. No.: 14/778,495

(22) PCT Filed: Sep. 14, 2015

(86) PCT No.: PCT/US2015/049893
§ 371 (c)(1),
(2) Date: Sep. 18, 2015

(87) PCT Pub. No.: WO2016/040919
PCT Pub. Date: Mar. 17, 2016

(65) Prior Publication Data
US 2017/0076117 A1    Mar. 16, 2017

(51) Int. Cl.
*G06K 7/015* (2006.01)
*G06K 17/00* (2006.01)
(Continued)

(52) U.S. Cl.
CPC ..... *G06K 7/10069* (2013.01); *G06K 7/10722* (2013.01); *G06Q 10/00* (2013.01); *G06K 2207/1011* (2013.01)

(58) Field of Classification Search
CPC ........ G06K 7/015; G06K 17/00; G08C 17/02; H04Q 5/22; H04Q 7/06; G08B 13/14
(Continued)

(56) References Cited

U.S. PATENT DOCUMENTS 6,538,563 B1 * 3/2003 Heng ................. G06K 7/10059
340/10.1
6,650,228 B1 * 11/2003 Vacherand ......... G06K 7/10019
340/10.2
(Continued)

OTHER PUBLICATIONS

Yang et al.,"Revisting Tag Collision Problem in RFID Systems",39th International Conference on Parallel Processing, ICPP 2010, San Diego, California, USA, Sep. 13-16, 2010.
(Continued)

*Primary Examiner* — Nam V Nguyen
(74) *Attorney, Agent, or Firm* — Flachsbart & Greenspoon, LLC; Joseph C. Drish

(57) ABSTRACT

Methods and an apparatus for implementing a read cycle for identifying RFID tags among a plurality of RFID tags is disclosed. The read cycle comprises of selecting a group of items for reading and receiving identifiers from one or more items of the group, determining an aggregate data of the received identifiers, and comparing the aggregate data of the received identifiers with the aggregate data for the group from a previous read cycle. Further, where the aggregate data compared is equal, the read cycle is terminated, or where the aggregate data compared is not equal, the read cycle is repeated by forming at least one new group or by dividing the group into at least two subgroups and running the read cycle for each subgroup. The read cycle is performed in a time proportional to the number of tags that have changed and logarithmic in the total number of tags.

28 Claims, 12 Drawing Sheets

(51) Int. Cl.
*G08C 17/02* (2006.01)
*G08B 13/14* (2006.01)
*H04Q 5/22* (2006.01)
*G06K 7/10* (2006.01)
*G06Q 10/00* (2012.01)

(58) Field of Classification Search
USPC .......... 340/10.1–10.5, 539.3, 539.16, 572.4, 340/572.8, 5.8, 3.1
See application file for complete search history.

(56) References Cited

U.S. PATENT DOCUMENTS

| | | | | |
|---|---|---|---|---|
| 7,333,018 | B2* | 2/2008 | Singh | G01S 5/02 340/10.1 |
| 7,336,154 | B2* | 2/2008 | Friedrich | G06K 7/0008 340/10.2 |
| 7,443,282 | B2* | 10/2008 | Tu | G06Q 10/06 235/385 |
| 7,616,093 | B2* | 11/2009 | Smith, Jr. | G06Q 10/087 340/10.1 |
| 7,701,348 | B2 | 4/2010 | Kim | |
| 7,893,815 | B2* | 2/2011 | Friedrich | G06K 7/0008 340/10.1 |
| 7,932,830 | B2* | 4/2011 | Campero | G01S 13/82 340/10.2 |
| 8,427,316 | B2 | 4/2013 | Bielas | |
| 2006/0022800 | A1 | 2/2006 | Krishna et al. | |
| 2009/0160622 | A1 | 6/2009 | Bauchot et al. | |
| 2009/0219141 | A1* | 9/2009 | Pillai | G06K 7/10059 340/10.2 |
| 2010/0201494 | A1* | 8/2010 | Ryou | G06K 7/0008 340/10.2 |
| 2010/0277286 | A1 | 11/2010 | Burkart et al. | |
| 2012/0235817 | A1 | 9/2012 | Forster | |
| 2016/0158625 | A1* | 6/2016 | DeAngelis | H04W 4/008 340/539.13 |

OTHER PUBLICATIONS

Wang et al., "Efficient and Reliable Low-Power Backscatter Networks", SIGCOMM '12, pp. 61-72, Helsinki, Finland, Aug. 13-17, 2012.
Invitation to Pay Additional Fees in International Application No. PCT/US15/49893, dated Nov. 13, 2015.
Written Opinion of the International Searching Authority, International Application No. PCT/US15/49893, dated Jan. 21, 2016.
International Search Report, International Application No. PCT/US15/49893, dated Jan. 21, 2016.
Search Strategy and Results in International Application No. PCT/US2015/049893, dated Jan. 21, 2016.
Notification of Transmittal of the International Search Report and the Written Opinion of the International Searching Authority, or the Declaration, dated Jan. 21, 2016.
Notifiction of Transmittal of IPRP in International Application No. PCT/US15/49893, dated Nov. 17, 2016.
International Preliminary Report on Patentability in International Application No. PCT/US15/49893, dated Nov. 17, 2016.
Yuanqing Zheng, Mo Li, P-MTI: Physical-layer Missing Tag Identification via Compressive Sending, in Proceedings of the IEEE INFOCOM, pp. 917-925, Turin, Italy, Apr. 2003.

* cited by examiner

|  | BIT 1 | BIT 2 | BIT 3 | BIT 4 |
|---|---|---|---|---|
| ITEM 1 | 0 | 1 | 0 | 1 |
| ITEM 2 | 1 | 1 | 0 | 1 |
| ITEM 3 | 1 | 0 | 1 | 0 |
| ITEM 4 | 0 | 1 | 1 | 1 |
| Σ (AGGREGATED DATA) | 2 | 3 | 2 | 3 |

| | BIT 1 | BIT 2 | BIT 3 | BIT 4 |
|---|---|---|---|---|
| ITEM 1 | 0 | 1 | 0 | 1 |
| ITEM 4 | 0 | 1 | 1 | 1 |
| Σ (AGGREGATED DATA) | 0 | 2 | 1 | 2 |

FIG. 1B

| | BIT 1 | BIT 2 | BIT 3 | BIT 4 |
|---|---|---|---|---|
| ITEM 2 | 1 | 1 | 0 | 1 |
| ITEM 3 | 1 | 0 | 1 | 0 |
| Σ (AGGREGATED DATA) | 2 | 1 | 1 | 1 |

|  | BIT 1 | BIT 2 | BIT 3 | BIT 4 |
|---|---|---|---|---|
| ITEM 2 | 1 | 1 | 0 | 1 |
| ITEM 3 | 1 | 0 | 1 | 0 |
| Σ (AGGREGATED DATA) | 2 | 1 | 1 | 1 |

*FIG. 1C*

|  | BIT 1 | BIT 2 | BIT 3 | BIT 4 |
|---|---|---|---|---|
| ITEM 3 | 1 | 0 | 1 | 0 |

*FIG. 1D*

| ITEM 2 | BIT 1 | BIT 2 | BIT 3 | BIT 4 |
|--------|-------|-------|-------|-------|
|        | 1     | 1     | 0     | 1     |

*FIG. 1E*

| ITEM 2 | BIT 1 | BIT 2 | BIT 3 | BIT 4 |
|--------|-------|-------|-------|-------|
|        | 1     | 1     | 0     | 1     |

*FIG. 1F*

| ITEM 2 | BIT 1 | BIT 2 | BIT 3 | BIT 4 |
|---|---|---|---|---|
| | 1 | 1 | 0 | 1 |

*FIG. 1G*

| ITEM 3 | BIT 1 | BIT 2 | BIT 3 | BIT 4 |
|---|---|---|---|---|
| | 1 | 0 | 1 | 0 |

*FIG. 1H*

FIRST BIT = 0

| | BIT 1 | BIT 2 | BIT 3 | BIT 4 |
|---|---|---|---|---|
| ITEM 1 | 0 | 1 | 0 | 1 |
| ITEM 4 | 0 | 1 | 1 | 1 |
| Σ (AGGREGATED DATA) | 0 | 2 | 1 | 2 |

*FIG. 2*

FIRST BIT = 1

| | BIT 1 | BIT 2 | BIT 3 | BIT 4 |
|---|---|---|---|---|
| ITEM 2 | 1 | 1 | 0 | 1 |
| ITEM 3 | 1 | 0 | 1 | 0 |
| ITEM 5 | 1 | 0 | 0 | 1 |
| Σ (AGGREGATED DATA) | 3 | 1 | 1 | 2 |

*FIG. 3*

FIRST BIT = 1

| | BIT 1 | BIT 2 | BIT 3 | BIT 4 |
|---|---|---|---|---|
| ITEM 2 | 1 | 1 | 0 | 1 |

FIG. 4

FIRST BIT = 1
SECOND BIT = 0

| | BIT 1 | BIT 2 | BIT 3 | BIT 4 |
|---|---|---|---|---|
| ITEM 3 | 1 | 0 | 1 | 0 |
| ITEM 5 | 1 | 0 | 0 | 1 |
| Σ (AGGREGATED DATA) | 2 | 0 | 1 | 1 |

FIG. 5A

FIRST BIT = 1
SECOND BIT = 1

| ITEM 2 | BIT 1 | BIT 2 | BIT 3 | BIT 4 |
|---|---|---|---|---|
|  | 1 | 1 | 0 | 1 |

*FIG. 5B*

FIRST BIT = 1
SECOND BIT = 0
THIRD BIT = 0

| ITEM 5 | BIT 1 | BIT 2 | BIT 3 | BIT 4 |
|---|---|---|---|---|
|  | 1 | 0 | 0 | 1 |

*FIG. 6*

FIRST BIT = 1
THIRD BIT = 0

| ITEM 2 | BIT 1 | BIT 2 | BIT 3 | BIT 4 |
|---|---|---|---|---|
|  | 1 | 1 | 0 | 1 |

FIG. 7A

FIRST BIT = 1
THIRD BIT = 0

|  | BIT 1 | BIT 2 | BIT 3 | BIT 4 |
|---|---|---|---|---|
|  |  |  |  |  |

FIG. 7B

READ CYCLES FOR IDENTIFYING RFID TAGS

CROSS-REFERENCE TO RELATED APPLICATIONS

The present invention claims the priority of provisional patent application No. 62/049,510 filed on Sep. 12, 2014, the contents of which are incorporated herein.

TECHNICAL FIELD

The present disclosure relates generally to a method and system of identifying RFID tags among a plurality of RFID tags. In particular, the present disclosure relates to methods and an apparatus for identifying RFID tags among a plurality of RFID tags, where each RFID tag has an identifier.

BACKGROUND

RFID tags attached to retail items have been successfully deployed in retail environments for inventory tracking and control. The RFID tags communicate wirelessly with RFID readers and transmit their identifiers or other data associated with items to the RFID readers on interrogation. The identifiers are used to obtain information related to the attached articles or their locations. When the RFID readers interrogate one or more RFID tags through RF waves, the tags respond to the interrogating RF waves in a process known as backscatter.

One major factor limiting with current technologies for RFID readers is the limited bandwidth available for communication with the RFID tags. Every deployed tag requires a fixed amount of bandwidth in order to be read by the RFID reader. Thus, as the number of tags increases, the bandwidth requirement increases linearly. Furthermore, the bandwidth constraints increase the time that it takes to complete a read cycle thus limiting the ability to use RFID in real-time for environments with dense tags. Since, real time tracking is extremely useful for many applications there is a demand for real-time tracking of RFID tags.

There are many methods for increasing the available bandwidth. Current mechanisms focus on variation of CDMA and TDMA in order to increase bandwidth. For example, Ultra Wide Band (UWB) a CDMA technology has been proposed as a means of increasing bandwidth. While TDMA does not increase bandwidth, it allows for segmentation of the RFID tags into different time spots thus reducing collisions and enabling a higher density of tags. However, the bandwidth of TDMA is quite limited and hence reads can take quite a while. Additionally, these methods suffer from increased overhead when scaling to a large number of tags and only partially increase the required bandwidth. By far, the most prevalent method for increasing bandwidth is to divide the geographical area into small regions. By using a large number of RFID readers, each reader can read the tags in a small region around it. While each reader has limited bandwidth, the total system bandwidth is increased by the large number of readers, each of which reads from a different region.

However, even when a large number of readers are deployed, RFID tags mostly used in retail environments have limited computational power, thus coordination among tags to efficiently utilize bandwidth becomes increasingly difficult. Additionally, in some cases, smart tags are utilized. The existing systems allow only a small subset of tags to broadcast at a given time period, and the smart tags include microcontrollers to control the tags' broadcast for a given time period. Such smart tags are relatively expensive. Thus, limited coordination among tags and the demand for bandwidth continue to be major limiting factors for reducing the read cycles for identifying tags by an RFID reader.

Also, increasing the number of RFID readers incurs significant cost in deployment, power consumption and maintenance as well as technical issues due to reader-reader interference. The benefits of multiple readers are also limited by the number of channels which are available for RFID readers.

In view of the above, there is a need for improved readings by RFID readers to utilize bandwidth availability, and reduce the deployment and maintenance cost of RFID in retail environments.

Definitions

Read cycle—A read cycle refers to a single complete scan or attempted scan of all tags in the range of a single reader.
Aggregate data—Aggregate data can be any method of combining data from multiple tags. For example, the sum of the tags in the physical layer or the sum of the waveforms of the data transmitted by tags is a means of aggregating data.
Combined Read (CR)—A combined read is when multiple tags broadcast simultaneously and is a means of reading multiple tags at once. Currently, when multiple tags broadcast at once, this results in a collision and the read attempt fails. In contrast, the goal of a combined read is to separate the aggregate data received into the multiple sources of the data. In the physical layer a CR looks like a collision. However, it is treated differently.
Shadow combined read (SCR)—A SCR is a simulation of a combined read based on data. Data used to construct a SCR can come from previous read cycles, gateway controls, and knowledge of items in inventory or other methods.
Residual space—The residual space is the space which is the difference between the current signal and the previous signal.
Commodity tag—an RFID tag without a microcontroller.

SUMMARY OF THE INVENTION

A method implementing a read cycle for identifying RFID tags among a plurality of RFID tags, each RFID tag having an identifier is disclosed. The read cycle comprises (a) selecting a first group of items for reading and, using an RFID reader, receiving identifiers from one or more items of the first group; (b) determining first aggregate data about the received identifiers of the first group; (c) storing the first aggregate data in the RFID reader; (d) selecting a second group of items for reading and, using an RFID reader, receiving identifiers from one or more items of the second group, where the second group may or may not be different from the first group; (e) determining second aggregate data about the received identifiers of the second group; (f) comparing the first aggregate data with the second aggregate data; and if the result of step (f) is within a predetermined margin, terminating the read cycle; or if the comparison is not within the predetermined margin, repeating steps (a) through (f) by forming at least one new group that is a subset of the first group and (g) repeating steps (a) through (f) treating the at least one new group as a new first group, and performing step (e) by adjusting the second group to exclude corresponding items of the first group that are not in the subset of the first group; and repeating through step (g) as required to determine what RFID tag of the first group has been added, modified or subtracted with respect to the first group.

Aggregate data can be any method of combining data from multiple tags. For example, the sum of the tags in the physical layer is a means of aggregating data. Data can also be aggregated using changes in phase or time of flight where instead of the mere sum of values which have been received the signal is summed over multiple time periods. The phase and amplitude of the signal can also be taken into account in the means of aggregation.

There are many networks such as backscatter networks (e.g., RFID) in which communication is made from multiple nodes (sometimes called tags or sensors). RFID is simply an example of such networks and many others exist such as NFC stack and the ISO 14443. Further examples include sensor networks, cellular networks and many other examples.

In current RFID deployments, every tag requires a fixed amount of bandwidth in order to be read out. Thus, as the number of tags increases, the bandwidth requirement increases linearly. This problem is one of the major limiting factors in the number of tags which can be read by an RFID reader. Furthermore, the bandwidth constraints increase the time that it takes to complete a read cycle thus limiting the ability to use RFID in real-time for environments with dense tags. Since, real time tracking is extremely useful for many applications there is a demand for real-time tracking of RFID tags.

Note that the protocol for RFID is a special case of protocols in which collisions add overhead or in which broadcasts of two transmitters in the same timeslot causes overhead. As such, the described solution is applicable to a much wider set of problems than backscatter networks. More generally, the described protocol can improve bandwidth availability and number of tags supported in many environments with multiple transmitters.

For practical deployments, the vast majority of RFID tags in a given area do not change within a given time frame. For example, in the retail environment, turnover of stock in short time periods is limited. Thus in a given time period (e.g., the time between two subsequent read cycles) the tag IDs, the information on the tags and the locations of the vast majority of tags do not change.

The key challenge is being able to quickly identify the changes in the set of RFID tags present without interrogating all of the tags. Using current methods, the number of reads and the time required to read a set of tags depends on the number of tags and remains fixed regardless of the number of tags which have changed. The described embodiments use group testing and compressive sensing to do group testing in the residual space to detect all of the tags. The described embodiments utilize group testing with models on the residual space (the space which is defined by subtracted measurements from other measurements).

The described embodiments utilize the data from previous read cycles. In practical applications the vast majority of tags do not change in between subsequent read cycles. The described embodiments may be the first technology to actually use the data from previous read cycles to speed up the current read cycle when tags are added or moved. Furthermore, the described embodiments do not require the use of smart tags such as MOO or WISP.

The main barrier to utilizing the information from the previous read cycles is that one does not know which tags have changed.

One additional complication is that all RFID tags have non-zero signals and hence merely testing whether the signal is positive or negative does not suffice. Furthermore, the readout is not binary but one needs to know how many of the set are positive and not just whether one tag is. Hence additional information is required.

In the described embodiments, this information is in the form of the data from the previous read cycle. If the vast majority of tags do not change, one can work in the residual space, a concept known in the field of compressive sensing. The residual space is the space which is the difference between the current signal and the previous signal. In this case, the described embodiments utilize comparisons in the physical layer.

Note that the RFID signal is often thought of as a vector where each bit of the tag is a different element of the vector. It is possible to consider even finer grained measurements in which the signal is analog both in magnitude and in time.

One advantage of a time based analog signal is that it allows us to detect changes in location of a tag even within the read range of a single reader since the time of flight (ToF) may change.

The amplitude of a signal is influenced both by the tag as well as by the tag location. For example, RSSI is a known method for taking into account the signal strength in order to determine location of the tag.

Note that if the tag location does not change, the RSSI, ToF, angle of arrival (AoA) and other parameters do not change. Thus aggregating multiple tags will result in a value which does not change.

The described embodiments contemplate that a signal that does not change refers to a signal whose change is less than a noise level. The noise level can be determined either a priori before the protocol starts or during the protocol itself.

One way of measuring noise during the protocol, is to note that most tags do not change (in identity, data, location, and other parameters). Thus one can take e.g. the median difference between the same tags in multiple read cycles as a measure of the noise.

While conventional methods may view collisions as an obstacle to be overcome, in contrast here, the disclosed embodiments view collisions as an opportunity to be actively created and/or manipulated.

A combined read (CR) is the RF signal (in the physical layer) which is the result of the (sum of) values of the RF signal from multiple tags. Note that this is simply the sum of the waveforms and is what is measured when there is a tag collision.

A Shadow Combined Read (SCR) is the expected result which would have resulted from a given combined read (even if the CR was not actually made).

A SCR can be constructed from the knowledge of tags in a previous read cycle. For example, if all of the tags in a given read cycle are present, one can construct all possible SCR by summing up the value of the tags. Since there is fading due to geography one can utilize that in the SCR for geographical location.

In order to use group testing, the described embodiments avail themselves of the ability to choose random (or alternatively arbitrary) subsets of tags and read the combined signal from the physical layer. In order to do this, there should be a random (or alternatively arbitrary) set of tags to broadcast at the same time. However, given a large number of tags with random ID's, if one chooses a random subset of bits and a random assignment of values to those bits, it is possible to cause all of the tags with those values to broadcast at once using the current EPCGen2 Protocol (the classic tree-walking RFID utilizes the same mechanism). While this selection of tags is not completely random (due to potential correlations between bit choices) for reasonable values of tags it behaves randomly and thus suffices for present purposes.

Of course, other methods of choosing random subsets can be taken. For example, all tags in a given area can be queried by beamforming energy into an area or by using emitters which are in different regions, all tags in a ring around the reader or another emitter can be read by controlling amplitude of emission. Alternatively, tags can have delays which are preset into the tags or which are random to create sets (e.g. different preset delays for diff subsets). Additionally, one could set delays to be dependent on previous rounds. Another method is to compile a table of subsets of tags and their sums and look for matching sums which happen to collide. Generally there are many methods for aggregating sets of tags into a single read.

One way of understanding the described embodiments is that it is analogous to a tree-like search as is done currently. However, in contrast to the current method (which will discard any read in which more than one tag responds) if the tree-like search results in an aggregated signal (combined read) which is the same as the (predicted) shadow combined read (e.g., calculated from values received) from the previous read cycle, the described embodiments do not need to continue the search to a lower depth but can determine the values of the entire set of tags (since they have not changed). Conversely, if the CR is not equal to the shadow combined read of the previous read cycle, the embodiments will then recurse over the tree to find exactly which tags have changed.

Discussion now proceeds to a simple implementation of the method.

Suppose that N RFID tags of m bits (currently m=96 bits is standard) exist. Suppose that a bound k<<n of the RFID tags change. WLOG, one assumes that all of the data is the RFID tag identifier and assumes for simplicity of exposition, that the tags are added/removed and not moved (moving a tag can be treated similarly as both an added tag and a removed tag). One assumes that the identifiers are chosen randomly from among the $2^m$ possible tag identifiers At this point, the probability of any fixed value for a tag is $2^m$. This results in the following observation: For any k changed tags, the probability of the signal magnitude resulting in all m bits not changing (by not changing, it is meant the power, the angle, the delay and other features of the signal) is less than $2^m$. Note: One does not need to use all of the m bits but can suffice with fewer as this can result in even faster reads.

This is due to the fact that for any k−1 changed tags the value of the final tag must be restricted to have changes in the coordinates which have previously been modified. The probability of this is $2^m$ (in fact the observation can be made stronger by noting that the direction of the change is determined and limited).

Now the read step occurs. This step utilizes the ability to choose a random (or alternatively arbitrary) subset of tags. This is a subset of random tags in which to induce a collision. However, if one chooses l bits at random and assigns random binary values to the l bits, the number of tags which have the assigned values in all l bits is approximately $N/2^l$. This is referred to as choosing a random tags where j is determined by N; l. This allows one to randomly sample tags to cause them to collide.

Given a set of random tags the expected number of changed tags in the set is $k/2^l$. By choosing l=lg k, it is possible to set the expected number of changed tags to be equal to 1.

For random assignments to tags, the probability that one can distinguish if more than one tag is transmitting is exponentially good in m. This is due to the fact that each of the tags has an expected m/2 bits which are set to one. When both tags have a bit which is set to one, the amplitude is the sum of the amplitudes. Using the law of large numbers one can approximate how many bits are set to 1.

An embodiment of the protocol is as follows:
1. Choose l=lg k random bits of the m bits of the tag.
2. For each possible assignment to the l bits, let $S_i$ be the set of tags with the assignment in those bits. Note that there are $2^l=2^{lg k}=k$ possible sets and each is expected to have approximately n/k tags. Initialize a to be the set of $S_i$.
3. Initialize R to be the set of tags read in the previous read cycle.
4. While the set α is non empty:
   (a) Choose a random set $S_i$ from α.
   (b) Broadcast and ask all tags in to reply at the same time. Note that since the sets in are all defined by the fact that they have the same assignment for a set of bits one can do this using e.g., the EPCGen2 Protocol.
   (c) Do a combined read by collecting the amplitude (and optionally timing) of the reply by all of the tags responding for all of the m bits.
   (d) Calculate the expected amplitudes of the shadow combined read using the values R for the tags with these l bits from the last read cycle.
   (e) If the expected amplitudes matches the measured amplitudes, remove the set from α. In this case, if the amplitudes of the set has not changed there is no need to make any additional measurements since nothing has changed. In this case import the values from R.
   (f) If the expected value does not match and the size of the set is greater than 1 choose a random additional bit and add the sets defined by the current bits as well as the new bit set to zero and the new bit set to 1.
   (g) Otherwise, there has now been found a changed tag. Remove $S_i$ from α and modify R.

In some embodiments, one can revisit previous reads upon learning about new tags. For example, if there is a CR for A which is not equal to the SCR predicted for it, one may divide the set A into A1, A2 and completely read the set A1. If after reading A1, and updating knowledge of the CR for A based on knowledge of A1, the combined read for A is equal to the updated SCR for A, there is no need to do any additional reads in A2.

In an embodiment sets for CR can be chosen randomly using e.g., a slotted Aloha approach. If a CR differs from a SCR by a single tag (which can be determined e.g., by the fact that in all bits of the tag the difference of the CR and SCR is either 0 or 1), one can read the new tag. Upon reading the new tag, one can revisit all of the previous CR and update them appropriately. This can terminate when sufficient CR have been made and all of the CR match the update SCR.

In an embodiment, some tags are notified that they need no longer participate in the protocol if they have been successfully read.

It is important to note that in cases where the reader has limited gain, one can utilize a tradeoff of reducing the size of the sets. This will naturally incur more reads. It is also useful to note that the same method can be utilized even if the tags are not synchronized. This can be done simply by adding up all of the replies to get a composite amplitude.

It is also worthwhile mentioning that the cost of the recursion depends on the size of the set for each set. Thus any means which can be used to reduce the size will increase the speed. For instance, there can be multiple amplitudes, delays, etc. There can also be imposed various geometrical limitations on the sets.

For example, delays can partition the set of responses into smaller sets (each with a different delay) which can each be compared to the same set with same delays in the previous read cycle. These sets are circles around the reader.

Other methods of constructing a SCR can be utilized. For example, one can construct a SCR by looking at tags in a database and looking for potential sums, one can look at tags which have been introduced into an area (e.g., using gate controls), and other methods are also possible.

The protocol can also be used to bootstrap. By choosing a sufficiently large l, one can ensure that an expected one tag in each set will exist. This will enable the reading of the tag. Of course, in cases of multiple tags one can increase the value of l. Note that up to a constant factor this will require one read per tag and hence is as efficient as current methods.

One method of bootstrapping is below:
1. Have all of the tags broadcast at the same time.
2. Estimate the number of tags present. Denote the number of tags by n.
3. Choose l=lg n random bits.
4. Look at all possible assignments for the l bits.
5. For each possible assignment, have all of the tags with the given assignment for the l broadcast.
6. For each assignment estimate the number of tags.
7. If the number of tags is 1, the tag has been read.
8. Otherwise, choose additional random bit(s) and recurse with the two possible assignments.

This bootstrapping can be seen as running a conventional tree walking algorithm. Thus, the stated algorithm is a generalization of the widely used tree-walking protocol in which there will be a comparison of the current combined read to the previous shadow combined read. This comparison allows termination of the tree-walk if the combined read is the same as the shadow combined read.

Similarly to the tree walking protocol, one can start at any level of the tree. This shows that while an estimate of k is useful it is not necessary for the protocol to work.

One can also use other methods to construct the first read cycle.

In an embodiment, one might construct all of the combinations of pairs of tags from a previous read cycle. A collision of two tags can be resolved by comparing to the combination. The collision of more than two tags can be dealt with similarly.

In an embodiment, the aggregate sum is taken over the whole tag.

In another embodiment the aggregate sum is taken over a subset of bits.

In an embodiment, the reader itself will move. For example a handheld reader can move. This can be treated via several methods.

In an embodiment, if the movement speed is lower than the read cycle, one can simply treat the reader as fixed and update the locations of the tags after each read.

In an embodiment, this can be further improved by noting that the vast majority of tags do not change locations quickly. Thus, it is possible to choose (several) random sets of tags and triangulate the reader location based on the relative location of the reader relative to the set of tags. If several such sets are chosen, one can be sure that for at least one set of tags, none of the tags in that set has changed and thus it is possible to update the location of the reader. Once the new reader location is known (as compared to the previous location) one can update the location of all of the tags.

Of course, this can be seen as a generalization of the classic means of navigating by the stars. It is assumed that the location of the stars does not change and therefore one can update location based on relative position to the stars. The slight complication that sometimes stars do change can be fixed by taking multiple sets of 'stars' (e.g. tags) to ensure that at least one set is constant. The set of tags which does not change will have same relative locations to each other as opposed to changes in relative locations when a tag in a set moves.

The described embodiments can also utilize the group testing read with a moving reader. This can be done by noticing that if none of the tags in a combined read (CR) change, the difference in the CR will solely be dependent on the change in location of the reader. Thus, if there are several (e.g., two) CRs, (e.g. CR1 And CR2), one can compare them to their respective shadow combined reads (SCR) let us say SCR1, SCR2. Note that in what follows one assumes that the CR and SCR are measured for the geographical overlap of the range of the reader in both locations. One can assume this given the bounds on ToF which allows bounding of where the signal comes from. Since the speed is slow relative to the range, this overlap is non-negligible.

If CR1−SCR1=CR2−SCR2 then no tag has changed in either of the CR (since only a single degree of freedom was utilized and the movement was that degree of freedom). Optionally one can utilize more than two CR such as a third CR3 and compare to SCR3 and demand that for all i,j CRi−SCRi=CRj−SCRj (up to a noise factor). If CR1−SCR1≠CR2−SCR2 then at least one of the sets has a change. However, if there is any combination of sets such that CRi−SCRi=CRj−SCRj=Const then any set which CRi−SCRi≠Const has a tag changed. Any set which CRi−SCRi=Const does not have a tag changed.

Of course, one can use other methods to discover that the reader has moved while none of the tags has changed in a CR. For example, an inertial measurement of the distance the reader has moved might be used to predict the change in the CR based on the inertial change. One can use reference tags to measure the movement. One can also use random sets of tags to measure the movement.

Thus, there are many ways to utilize a CR to improve the read speed even when a reader is moving.

A method implementing a read cycle for identifying RFID tags among a plurality of RFID tags, each RFID tag having an identifier is disclosed. The read cycle comprises: (a) selecting a first group of items for reading and, using an RFID reader, receiving identifiers from one or more items of the first group; (b) determining first aggregate data about the received identifiers of the first group; (c) storing the first aggregate data; (d) selecting a second group of items for reading and, using an RFID reader, receiving identifiers from one or more items of the second group, where the second group may or may not be different from the first group; (e) determining second aggregate data about the received identifiers of the second group; (f) comparing the first aggregate data with the second aggregate data; and if the result of step (f) is within a margin, terminating the read cycle; or if the comparison is not within the margin, repeating steps (a) through (f) by forming at least one new group that may be a subset of the first group and (g) repeating steps (a) through (f) treating the at least one new group as a new first group, and performing step (e) by adjusting the second group to exclude corresponding items of the first group that are not in the subset of the first group; and repeating through step (g) as required to determine what RFID tag of the first group has been added, modified or subtracted with respect to the first group.

A method implementing a read cycle to identify RFID tags among a plurality of RFID tags, each RFID tag having an identifier is disclosed. The read cycle comprises forming at least two groups for reading of tags by selecting one or more values for the identifiers; reading tags for a group and receiving identifiers from one or more tags of the group and determining an aggregate data of the received identifiers; comparing the aggregate data of the received identifiers with the aggregate data for the group from a previous read cycle; and where the aggregate data compared is equal, determining that all tags of the first group have been identified and running the read cycle for another group; and where the aggregate data compared is not equal, determining that the number of tags of the first group has changed and repeating the read cycle by creating at least two new groups and running the read cycle for each new group.

In an embodiment the new groups are subsets of the original group.

In an embodiment the groups are chosen by choosing a bit. Each of the tags in a given group have the same value for that bit.

A tag reading apparatus for identifying RFID tags among a plurality of RFID tags, each tag having a tag identifier is disclosed. The tag reading apparatus comprises a receiver; a transmitter; a memory; a processor; wherein the processor is configured to run a read cycle comprising: (a) selecting a first group of items for reading and, using the tag reading apparatus, receiving identifiers from one or more items of the first group; (b) determining first aggregate data about the received identifiers of the first group; (c) storing the first aggregate data; (d) selecting a second group of items for reading and, using the tag reading apparatus, receiving identifiers from one or more items of the second group, where the second group may or may not be different from the first group; (e) determining second aggregate data about the received identifiers of the second group; (f) comparing the first aggregate data with the second aggregate data; and if the result of step (f) is within a margin, terminating the read cycle; or if the comparison is not within the margin, repeating steps (a) through (f) by forming at least one new group that is a subset of the first group and (g) repeating steps (a) through (f) treating the at least one new group as a new first group, and performing step (e) by adjusting the second group to exclude corresponding items of the first group that are not in the subset of the first group; and repeating through step (g) as required to determine what RFID tag of the first group has been added, modified or subtracted with respect to the first group.

A tag reading apparatus for identifying RFID tags among a set of RFID tags, each tag having an identifier is disclosed. The tag reading apparatus comprises a RFID reader wherein the reader is configured to execute a method implementing a read cycle, the read cycle comprising: (a) selecting a group of items for reading and receiving identifiers from one or more items of the group; (b) determining an aggregate data of the received identifiers; (c) comparing the aggregate data of the received identifiers with the aggregate data for the group from a previous read cycle; and (d) terminating the read cycle where the aggregate data compared is equal or when the difference between the aggregate data of the received identifiers and the aggregate data for the group from a previous read cycle is the identifier of a new or modified item; wherein the set of RFID tags includes commodity RFID tags that do not have a microcontroller and can also include RFID tags that have a microcontroller.

A method implementing a read cycle for reading data among a plurality of items, each item having an identifier is disclosed. The read cycle comprises: (a) selecting a first group of items for reading and, using an item reader, receiving data from one or more items of the first group; (b) determining first aggregate data about the received data of the first group; (c) storing the first aggregate data; (d) selecting a second group of items for reading and, using an item reader, receiving data from one or more items of the second group, where the second group may or may not be different from the first group; (e) determining second aggregate data about the received identifiers of the second group; (f) comparing the first aggregate data with the second aggregate data; and if the result of step (f) is within a margin, terminating the read cycle; or if the comparison is not within the margin, repeating steps (a) through (f) by forming at least one new group and (g) repeating steps (a) through (f) treating the at least one new group as a new first group, and performing step (e) by adjusting the second group to exclude corresponding items of the first group that are not in the subset of the first group; and repeating through step (g) as required to determine what item of the first group has been added, modified or subtracted with respect to the first group.

A method of implementing a read cycle for reading RFID tags among a plurality of RFID tags in which a device that reads the RFID tags may move, each RFID tag having an identifier is disclosed. The read cycle comprises: (a) dividing the plurality of RFID tags for reading into a set of groups; (b) taking a combined read for each group, measured for the geographical overlap of the range of the device reader; (c) taking a shadow combined read for each group, measured for the geographical overlap of the range of the device reader; (d) for each group, comparing the difference of the combined read and the shadow combined read to all the other groups; (e) determining that an item has changed when the difference between any of the combined reads and the shadow combined reads is not within a noise factor; wherein a changed RFID tag is one where a tag has been added, subtracted, or moved its location.

BRIEF DESCRIPTION OF THE DRAWINGS

FIGS. 1-4 illustrate groups and sub-groups of items formed in accordance with an embodiment.

FIGS. 5-7 illustrate further sub-groups formed in accordance with an embodiment.

DETAILED DESCRIPTION

Figure 8:
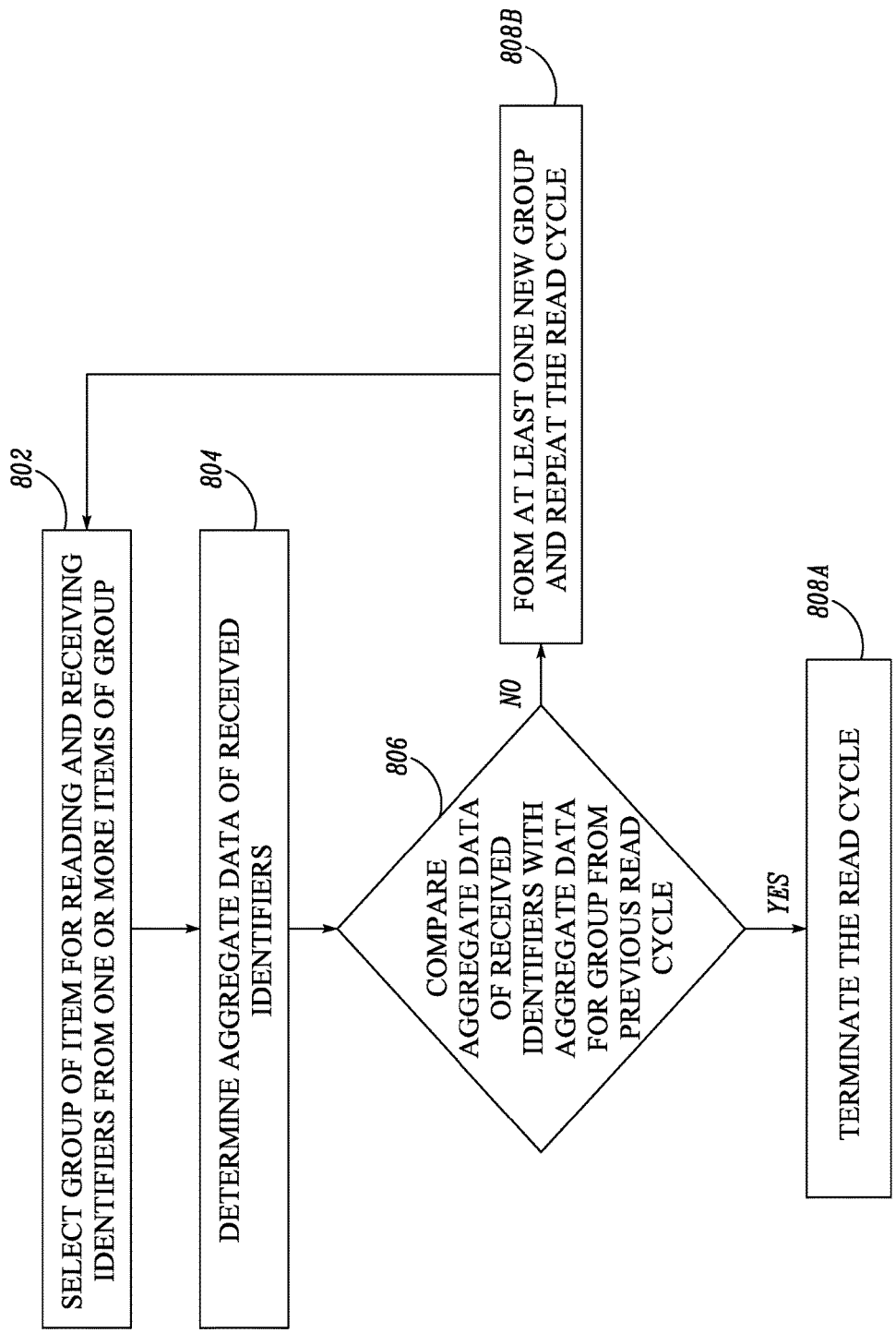
FIGS. 8-10 illustrate a flowchart illustrating a method in accordance with an embodiment.

It will be understood by those skilled in the art that the foregoing objects and the following description of the nature of invention are exemplary and explanatory of the invention and are not intended to be restrictive thereof.

For the purpose of promoting an understanding of the principles of the invention, reference will now be made to various alternative embodiments and specific language will be used to describe the same. It will nevertheless be understood that no limitation of the scope of the invention is thereby intended, such alterations and further modifications in the illustrated method and system, and such further applications of the principles of the invention as illustrated therein being contemplated as would normally occur to one skilled in the art to which the invention relates.

Many of the functional units described in this specification have been labeled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like.

Modules may also be implemented in software for execution by various types of processors or microprocessors. An identified module of executable code may, for instance, comprise one or more physical or logical blocks of computer instructions which may, for instance, be organized as an object, procedure, or function. Nevertheless, the executable of an identified module need not be physically located together, but may comprise disparate instructions stored in different locations which, when joined together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data maybe collected as a single data set, or may be distributed over different locations including over different member disks, and may exist, at least partially, merely as electronic signals on a system or network.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

A method and system of identifying items is disclosed. The items can include articles in a retail environment, or sensors or electronic devices. Each item has an identifier. In accordance with an embodiment, the identifier can be data carrying information of the item, a serial number stored on a tag attached to the items, or other form of desired data. The identifier allows communication to be addressed to the particular item through the identifier. In accordance with an embodiment, the serial number of tags is represented as a plurality of bits. Based on these identifiers, information of the items can easily be accessed such as their availability, number of items, and the physical tracking of the items.

A read cycle for identifying items in a network, each item having an identifier is disclosed. In accordance with an embodiment, a read cycle refers to a scan of all the items by a reader in a particular environment, such as a retail environment. In accordance with an embodiment, the network can be a wireless Radio Frequency Identification (RFID) network. However, the network is not only limited to a wireless network, and include any other network that incorporates the use of electromagnetic signals. In accordance with alternate embodiment, the network includes sensor networks wherein each sensor having an identifier transmits data to a central server. These sensors can be fixed or mobile. In accordance with further embodiments, the set of sensors can be known while the data transmitted by the sensors varies.

The read cycle comprises of selecting a group of items and receiving identifiers from one or more items of the group. In accordance with an embodiment, a reader interrogates or sends a query based on a condition defined by the reader to identify items. Further, in accordance with an embodiment, the selection of the group of items can be based on a selection of a value for the identifiers of the items of that group. In case, the identifiers are plurality of bits, a group can be selected by selecting a bit value of the identifier. For example, a query can be sent by the reader, requesting a group of items, wherein the identifiers having the first bit selected to 1 or 0, or the identifier having the first two bits selected to be 00, 01, 10, or 11, and so on. However, other methods of selecting a group of items can be employed, such as the existing technologies based on Aloha protocols, and there are a fixed number of time slots in which the tags attach to an item and broadcast their IDs, i.e., the identifiers. In such cases, a group of items can be associated with one of the time slots. Similarly, other methods of selection of a group of items can be employed.

On receiving identifiers from one or more items of the selected group, the read cycle comprises of determining an aggregate data of the received identifiers. In accordance with an embodiment, wherein the identifiers are a plurality of bits, the aggregated data is the sum of bit values of the identifiers. In accordance with an embodiment the sum is limited to be either zero or one (bitwise sum). In accordance with another embodiment the sum of bits is not limited to be a bit but can be an arbitrary number. In accordance with alternate embodiment, other means of predicting the aggregate data such as stock checks, gateway controls etc. can be employed. FIG. 1 depicts a table as an example of the aggregated data of the identifiers where the identifiers comprise of 4 bit values. In table of FIG. 1, four items having identifiers: (0101), (1101), (1010) and (0111) for item 1, item 2, item, 3 and item 4 are shown respectively. The aggregated data in such case is given as summation of the bit values of the four identifiers as (2, 3, 2, 3).

In an embodiment the signal is received as an analog signal and turned into a discrete signal using known methods in the art. In another embodiment the signal is compared to predicted analog signals directly.

In an embodiment the location of a tag within the range of a reader can also be found. This is due to the fact that if a tag does not move, its time of flight as well as its phase do not change. However, when a tag moves, the time of flight and/or the phase from the reader change. If the aggregate function used includes the aggregate over time then a change in time of flight would register in the change of time of flight. Similarly a change in phase would result in a change in the pattern of constructive and destructive interference. Thus a change of phase can be detected e.g., by the change in interference patterns.

In accordance with a further embodiment, the aggregate data of the received identifiers is compared to the aggregate data for the group from a previous read cycle. In accordance with a preferred embodiment, all the items are read and the number of items and their identifiers are stored in a database prior to running a read cycle. The data of the identifiers of the group of items is available from a previous read cycle and can be simulated or calculated from knowledge of tags. In accordance with an embodiment, where the aggregated data compared is equal, then all the items of that group are determined to be identified, and the read cycle is terminated. In accordance with an embodiment, the aggregate data is compared equal if a match is received between the aggregated data of the received identifiers and the aggregated data of the group from the previous read cycle. In accordance with a further embodiment, the match can be either exact or can differ by a noise value, such as the noise generated while tags transmit their identifiers or other data. The noise value can either be predetermined or vary depending on the data received.

FIG. 2 depicts a table as an example of all items identified in a read cycle. Also, it is considered that no item has been removed or added. For reference of the previous read cycle, the table of FIG. 1 is considered. Herein, the table of FIG. 2 represents the aggregated data of the received identifiers from a group of items wherein the first bit value of the identifier is equal to 0. Further, a table shown in FIG. 1A represents aggregated data from the previous read cycle (FIG. 1) wherein the first bit value of the identifier is equal to 0. Since, no item has been added or removed, item 1 and item 4 respond. And on comparing the aggregated data (0,2,1,2) of the received identifiers (0101) of item 1 and (0111) of item 4 as shown in FIG. 2, it is found to be the same as the aggregated data (0,2,1,2) of the identifiers of the items from the previous read cycle as shown in FIG. 1A. Thus, the read cycle is terminated and no change is determined for the group of items having the selected value in their identifiers.

However, in the above described read cycle, where the aggregated data compared is not equal, i.e., if a match is not received between the aggregated data of the received identifiers and the aggregated data for that group from the previous read cycle, then the number or identity of the items of that group is determined to be changed. In accordance with an embodiment, a change could be a missing item or a new item added in that group, or can be due to a change in location of an item of the group. The change of location of the item can be either within the read range of the reader, such as the RFID readers, in which case the method can detect changes in the location of the item within the range or the item can move outside the read range of the reader.

An example of a new item added to a group is represented in an example shown in FIG. 3 which depicts a table, wherein the aggregated data compared is not equal. For reference of the previous read cycle, the table of FIG. 1 is considered which depicts a table including identifiers and the aggregated data for 4 items. It is now considered that a new item 5 (1001) is added to the group of items of the table shown in FIG. 1. Herein, the table of FIG. 3 represents the aggregated data of the received identifiers from a group of items wherein the first bit value of the identifier is equal to 1. Further, a table shown in FIG. 1B represents aggregated data from the previous read cycle (FIG. 1) wherein the first bit value of the identifier is equal to 1. Since, a new item 5 (1001) is added to the group of items of the table in FIG. 1, along with item 2 and item 3 of the table in FIG. 1, item 5 also responds on interrogating the items in current read cycle. And on comparing the aggregated data (3,1,1,2) of the identifiers (1101) of item 2, (1010) of item 3, and (1001) of item 5, as shown in FIG. 3, it is found to be not matching the aggregated data (2,1,1,1) of the items from the previous read cycle, as shown in FIG. 1B. Thus, a change is determined in this particular group of items, which is the added item 5 (1001).

An example of a missing item from the group is represented in an example shown in FIG. 4 which depicts a table, wherein the aggregated data compared is not equal because of the missing item, which is either removed or has changed its location. For reference of the previous read cycle, the table of FIG. 1 is considered which depicts a table including identifiers and the aggregated data for 4 items. It is now considered that item 3 (1010) is now removed from the group of items shown in the table of FIG. 1. Herein, the table of FIG. 4 represents the aggregated data of the received identifiers from a group of items wherein the first bit value of the identifier is equal to 1. Further, a table shown in FIG. 1C represents aggregated data from the previous read cycle (FIG. 1) wherein the first bit value of the identifier is equal to 1. In such case, since item 3 has been removed, only item 2 responds on interrogating the items in current read cycle. And, on comparing the aggregated data, which is actually only the received identifier (1101) of item 2 as shown in FIG. 4, it is found to be not matching the aggregated data (2,1,1,1) of the items from the previous read cycle, as shown in FIG. 1C. Thus, a change is determined in this particular group of items, which is the missing item 3 (1010).

Figure 9:
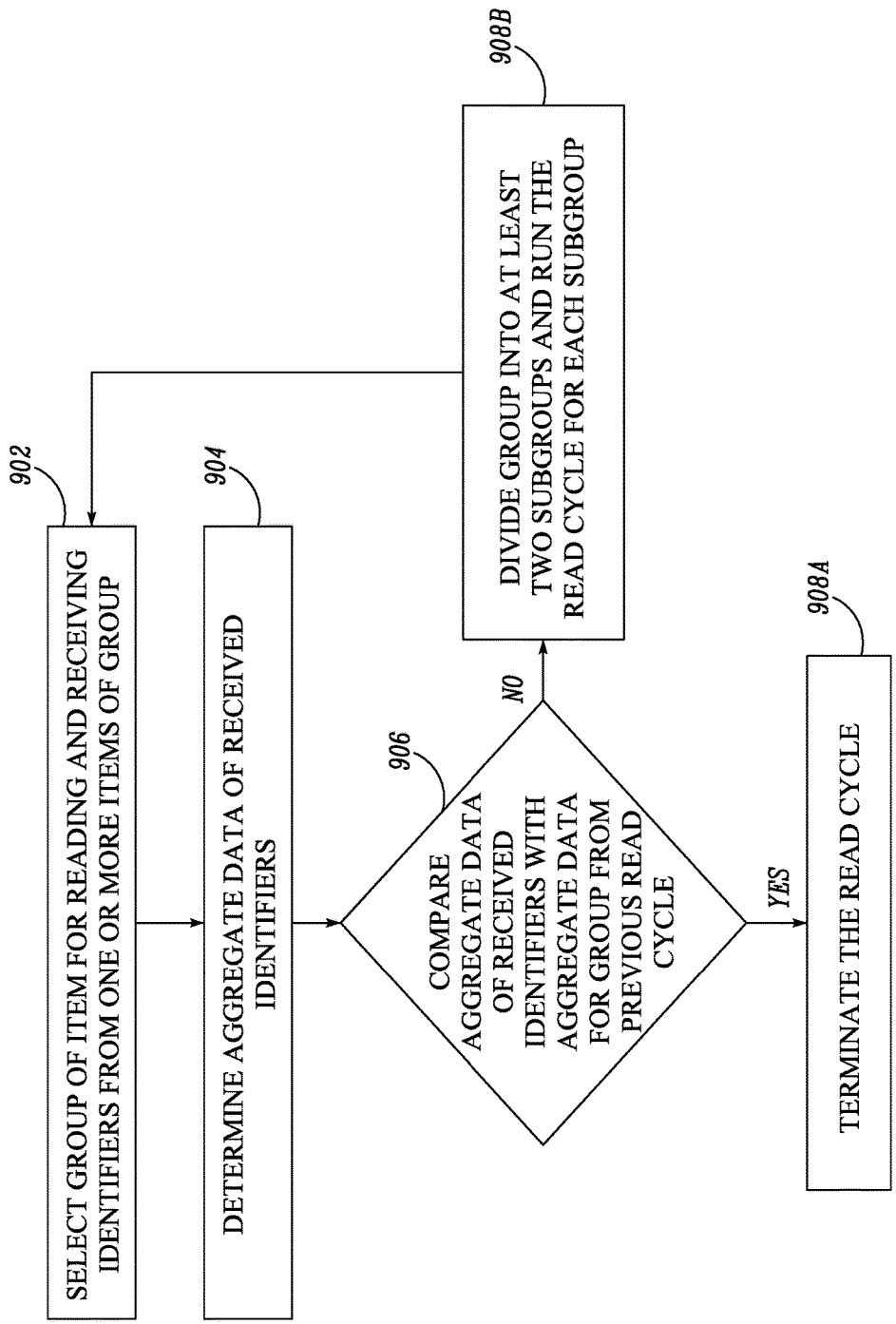

In accordance with an embodiment, where the aggregated data is not equal to the aggregated data from the previous read cycle, the read cycle is repeated by forming at least one new group and repeating the read cycle for the at least one new group. In accordance with an embodiment, the at least one new group is formed is by selecting a new value for the identifiers of the group. In accordance with another embodiment, the read cycle is repeated by dividing the group into at least two subgroups and running the read cycle for each sub group. FIG. 8 represents a flowchart in accordance with an embodiment. In step 802 a group of item is selected for reading and receiving identifiers from one or more items of the selected group. In step 804 an aggregate data of the received identifiers is determined. In step 806 the aggregate data of the received identifiers is compared with the aggregate data for the group from the previous read cycle. If the compared aggregate data is equal, then the read cycle is terminated in step 808a. If the compared aggregate data is not equal then at least one new group is identified in step 808b and the read cycle is repeated for the new group. FIG. 9 represents a flowchart in accordance with another embodiment. In step 902 a group of item is selected for reading and receiving identifiers from one or more items of the selected group. In step 904 an aggregate data of the received identifiers is determined. In step 906, the aggregate data of the received identifiers is compared with the aggregate data for the group from the previous read cycle. If the compared aggregate data is equal, then the read cycle is terminated in step 908a. If the compared aggregate data is not equal then, at least two sub groups from the previous group are formed and the read cycle is repeated for each subgroup.

Figure 10:
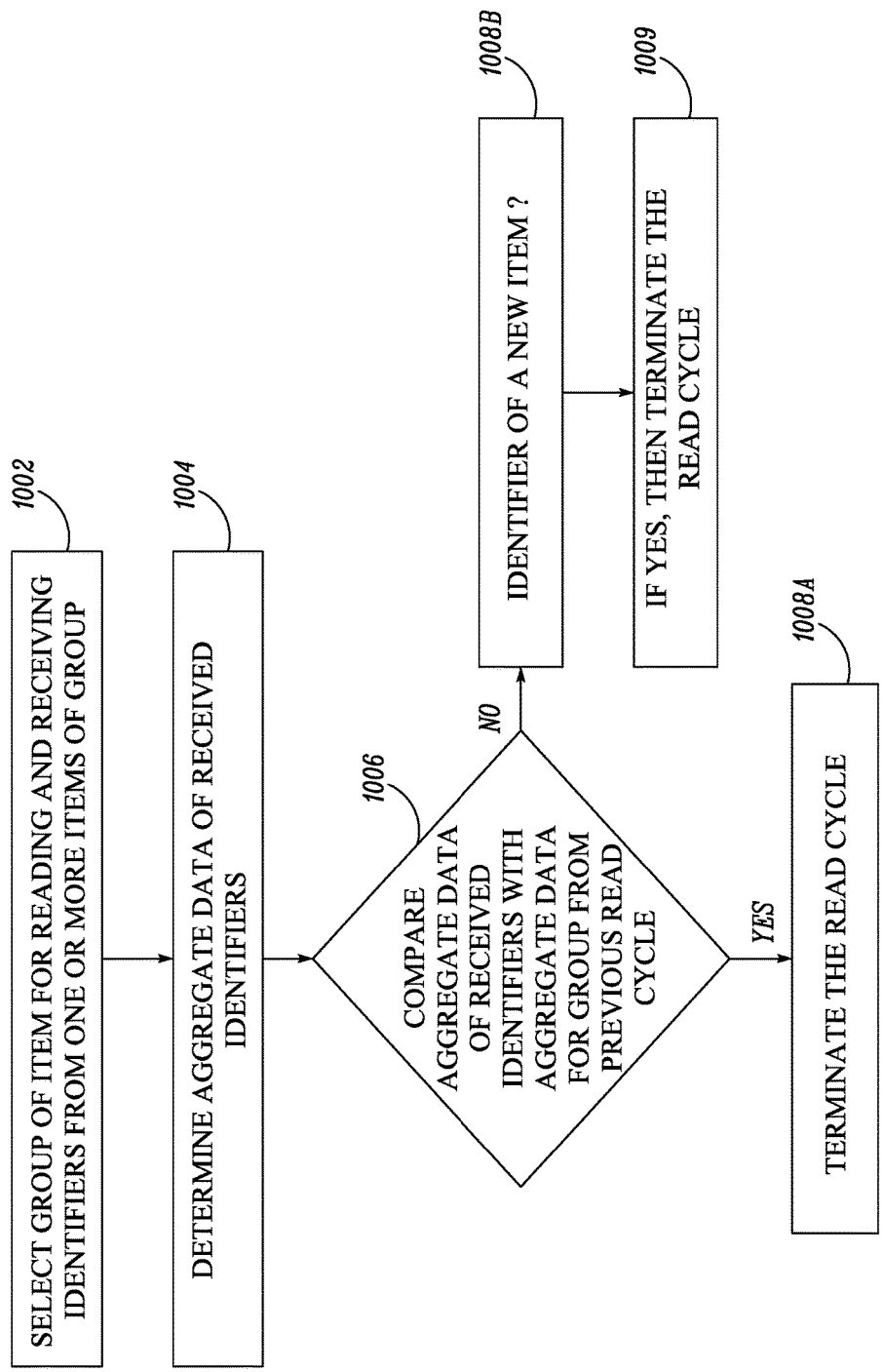

In accordance with an embodiment, the read cycle is repeated till at least one missing or added tag is identified. In accordance with a further embodiment, the read cycle is terminated when the identifier of a single item is received. The identified single item can be a new item in the group of items. In accordance with another embodiment, the read cycle is terminated on identifying a missing item. In accordance with another embodiment, the read cycle is terminated when the difference between the aggregated data of the received identifiers and the aggregated data for the group from a previous read cycle can be explained by a single item. The aggregated data can also be a predicted value from the previous read cycle. In accordance with an embodiment, the single new item identified can be a new item. Other methods of termination are also possible. FIG. 10 shows a flowchart in accordance with an embodiment. In step 1002 a group of item is selected for reading and receiving identifiers from one or more items of the selected group. In step 1004 an aggregate data of the received identifiers is determined. In step 1006, the aggregate data of the received identifiers is compared with the aggregate data for the group from the previous read cycle. If the compared aggregate data is equal, then the read cycle is terminated in step 1008*a*. If the compared aggregate data is not equal then, in step 1008*b* it is checked if the difference between the aggregate data of the received identifiers and the aggregate data for the group from a previous read cycle can be explained by an identifier of a new item. If yes, then the read cycle is terminated in step 1009.

In another embodiment, wherein the identifiers comprise of a plurality of bits, the bits are summed for a selected number of bits and the sum is compared to a predicted sum. If the sum is equal to the predicted sum, or closely matching the predicted sum, or up to a certain noise factor for tags which transmit data, the items or tags are considered to be read and not changed. Otherwise, a different set of items or tags are chosen to be summed and compared.

In accordance with a further embodiment, wherein the identifiers comprise of a plurality of bits, all the bits are summed and the sum is compared to a predicted sum.

In accordance with an embodiment, the division of the group of items into subgroups is by selecting a new value for the identifiers of the group. In accordance with an embodiment, where the identifiers are plurality of bits, new values are selected for the bits of the identifiers to form a group. Alternately, in addition to the bit value of the identifiers selected previously for a group, additional bit values can be selected to form sub-groups. For example, for an identifier having 3 bits, if the first bit value for the group in the previous read cycle is selected to be 1, then in the repeated read cycle, the second or the third bit values are selected to be 1 or 0. Such additional selection of bit values can be random or based on known protocols such as tree-walking algorithms or ALOHA protocols wherein different time slots can be selected to form new groups or subgroups.

An example of forming sub-groups is shown in FIG. 5, which represent two sub-groups formed on dividing the group of items shown in the table in FIG. 3, wherein a new item 5 (1001) had been added. For reference of the previous read cycle, the table of FIG. 1 is considered which depicts a table including identifiers and the aggregated data for 4 items. Specifically, FIG. 5A depicts a table which represents a sub-group formed wherein the first bit value of the identifiers is equal to 1 (same as table shown in FIG. 3) and an additional second bit value of the identifiers is selected to be 0. Further, a table shown in FIG. 1D represents aggregated data from the previous read cycle (FIG. 1) wherein the first bit value of the identifiers is equal to 1 and the second bit value of the identifiers is 0. Specifically, FIG. 5B depicts a table which represents a sub-group formed wherein first bit value of the identifiers is equal to 1 (same as table shown in FIG. 3), and an additional second bit value of the identifiers is selected to be 1. Further, a table shown in FIG. 1E represents aggregated data from the previous read cycle (FIG. 1) wherein the first bit value of the identifiers is equal to 1 and the second bit value of the identifiers is 1.

In the above example of FIG. 5, on comparing the aggregated data (2,0,1,1) of sub-group represented by FIG. 5A, with the aggregated data, i.e., item 3 (1010) of the reference table shown in FIG. 1D, it is still found not to be matching. However, on comparing the aggregated data, i.e., item 2 (1101), of sub-group represented by FIG. 5B, it is found to be matching the aggregated data, i.e., item 2 (1101), of the reference table shown in FIG. 1E. The read cycle is terminated for this group represented by FIG. 5B.

Further, an example of identifying a new item and terminating the read cycle on identifying a single new item is shown in the specific example of FIG. 5A, and FIG. 6. For the sub-group represented by FIG. 5A, wherein the aggregated data compared is not equal, the sub-group is further divided into two sub-groups, and the read cycle is now run for each sub-group. FIG. 6 shows an example of the two sub-groups formed from the sub-group shown in FIG. 5A. Specifically, FIG. 6 represents items, wherein the identifiers have the first bit value equal to 1 (same as FIG. 5A), the second bit value equal to 0 (same as FIG. 5A), and an additional third bit value selected to be equal to 0. Further, a table shown in FIG. 1F represents aggregated data from the previous read cycle (FIG. 1) wherein the first bit value of the identifiers is equal to 1, the second bit value of the identifiers is 1, and the third bit value of the identifiers is equal to 0. On selecting sub-group as represented in FIG. 6, identifier from only a single item is received. The read cycle is terminated here. On comparing the received identifier from a single item from sub-group of FIG. 6 to the sub-group of FIG. 1F, it is determined that the received identifier, item 5 (1001) does not belong to the known group of previous read cycle, i.e., FIG. 1. Thus, the single item is identified as a new item 5 added to the group of items in FIG. 1. Referring to the same example shown in FIG. 5A and FIG. 6, when the aggregated data of the received identifier from a single item can be explained by an identifier of a single new item, item 5 (1001) as shown in FIG. 6, the read cycle can be terminated. The determination can also be made on the basis that the aggregated data of the received identifiers from the sub-group in FIG. 5A cannot be explained as the sum of known items of the FIG. 1, which is the reference of the previously stored read cycle. Thus it is checked if the aggregated data of the present read cycle can be explained as the addition of an identifier of a new item to the combination of known items. Accordingly, a new item 5 (1001) is identified.

In accordance with an embodiment, the database of items is updated after a read cycle. For example, in the above example shown in FIG. 6, the new item 5 (1001) is added to the database of items of FIG. 1, and the database is accordingly updated.

According to an embodiment, the read cycle of one group can determine whether to read a different group. In the above example wherein aggregated data compared is equal, for example see FIG. 2 and FIG. 1A, the read cycle is not required to be repeated for further sub-groups formed from the group of FIG. 2 and the sub-group of FIG. 1A. Also, in the above example of FIGS. 5A and 6, since the difference in the aggregated data between FIG. 5A and the reference FIG. 1F is explained by the further sub-group shown in FIG. 6, no further sub-groups are required to be formed for the sub-group shown in FIG. 5A. Thus, the present read cycle improves bandwidth utilization and an added item is identified faster on comparing aggregated data instead of individually reading an identifier for each item.

In accordance with another embodiment, an example of identifying a missing item is shown an example FIG. 7. FIG. 7 represents two sub-groups formed on dividing the group of items shown in FIG. 4, wherein an item 3 (1011) has been removed. For reference of the previous read cycle, the table of FIG. 1 is considered which depicts a table including identifiers and the aggregated data for 4 items. Specifically, FIG. 7A depicts a table which represents a sub-group formed wherein the identifiers have the first bit value equal to 1

(same as table shown in FIG. 4) and an additional second bit value selected to be 1. Further, a table shown in FIG. 1G represents aggregated data from the previous read cycle (FIG. 1) wherein the first bit value of the identifiers is equal to 1 and the third bit value of the identifiers is 0. In the present example shown in FIG. 7A, the received identifier item 2 (1101) is found to be same as that of the stored reference, item 2 (1101) shown in FIG. 1G.

Thus, a new further sub-group is formed out the sub-group shown in FIG. 4. The further sub-group formed is shown in an example FIG. 7B. Specifically, FIG. 7B depicts a table which represents a sub-group formed wherein identifiers have the first bit value equal to 1 (same as table shown in FIG. 4), and an additional third bit value of the identifiers is selected to be 0. Further, a table shown in FIG. 1H represents aggregated data from the previous read cycle (FIG. 1) wherein the first bit value of the identifiers is equal to 1 and the third bit value of the identifiers is 1. As seen from the example FIG. 7B, the table is represented as blank since no identifier is received for such further sub-group formed. Whereas, the table in the reference FIG. 1H has an identifier from the single item 3 (1010). Thus, the item 3 (1010) is identified as a missing item. The database is accordingly updated to remove the missing item 3. Since, the difference in the received aggregate data of FIG. 4 is explained through the missing item 3 (1010), no further sub-groups are required to be formed. The read cycle is terminated on identifying the single missing item.

In accordance with the teachings of the above-described embodiments, the read cycle efficiency is improved on comparing the aggregated data of the subsequent read cycles to the previous read cycles. In accordance with an embodiment, the aggregated data of groups and sub-groups selected by the reader in the previous read cycles are stored in a database prior to running a read cycle.

In accordance with an embodiment, a read cycle to identify tags in a wireless communication network is disclosed, wherein each tag has an identifier. The read cycle comprises of forming at least two sub-groups by selecting values for the identifiers. The tag cycle is repeated for each group. In accordance with an embodiment, the number of tags and their identifiers are stored in a database of the tag reader prior to running a read cycle. In accordance with a further embodiment, the database of tags is updated after a read cycle.

In accordance with an embodiment, the reader is a RFID reader which carries out the read cycle and the tags are RFID tags.

In accordance with an embodiment, the RFID tag has fixed unique serial number identification.

In accordance with an embodiment, the item does not include a microcontroller.

In accordance with an embodiment, the tag is an RFID tag and does not include a microcontroller.

In accordance with another embodiment the item is not required to do any computation.

In accordance with another embodiment the item is an RFID tag and is not required to do any computation.

In accordance with another embodiment, the RFID tag does not include a pseudo random number generator.

A tag reader for identifying tags, each tag having a tag identifier in a wireless communication network is disclosed. The tag reader comprises of a receiver and a transmitter. The transmitter is configured to send a query or an interrogation signal to the tags and the receiver is configured to receive identifiers from the interrogated tags. Further, the tag reader comprises of a memory configured to store a database including the number of tags and their identifiers from the past read cycles in accordance with the teachings disclosed above. Further, the tag reader comprises of a processor to run the read cycle, as disclosed above.

In accordance with an embodiment, a tag reader for identifying tags in a wireless communication network comprises of a receiver, a transmitter, a memory and a processor. The processor is configured to run a read cycle comprising of selecting a group of tags for reading and receiving at the receiver, identifiers from one or more tags of the group. Further, the read cycle comprises of determining an aggregate of the received identifiers and comparing the aggregate data of the received identifiers with the aggregate data for the group from a previous read cycle. Where the aggregate data compared is equal or when the identifier of a single tag is received, the read cycle is terminated, or where the aggregate data compared is not equal, the read cycle is repeated by dividing the group into two subgroups and running the read cycle for each subgroup.

In accordance with an embodiment, where when the aggregate data compared is not equal, the processor is configured to repeat the read cycle till at least one missing, location changed or added tag is identified.

In accordance with an embodiment, the processor is configured to repeat the read cycle till a sub group comprises of a single tag.

In accordance with an embodiment, the processor is configured to select a group of tags by selecting a value for the identifiers.

In accordance with an embodiment, where the identifier is defined by a plurality of bits, the processor is configured to select a group of tags by selecting a value for a bit of the identifiers.

INDUSTRIAL APPLICABILITY

The key observation of the RFID technology is that for practical deployments, the vast majority of tags in a given area do not change within a given time frame. For example, in a retail environment, turnover of a stock in short periods is limited. Thus, in a given time period, i.e., the time between two subsequent read cycles, the tag IDs, the information on the tags and locations of the vast majority of tags do not change.

The key challenge is being able to quickly identify the changes in the set of RFID tags present without interrogating all of the tags. Using current methods, the number of reads and the time required to read a set of tags depends on the number of tags and remains fixed regardless of the number of tags which have changed.

The disclosed invention allows read times to be proportional to the number of tags which have changed and not linearly relative to the total absolute number of tags. In practice the number of tags which have changed is orders of magnitude lower than the total number of tags.

The read cycle disclosed exploits the fact that the vast majority of tags on retail/warehouse floor do not change in a given time frame. For example, in a retail store with 10,000 items, only 1-2 items are sold on average per minute. Current methods require all of the tags to be read in every read cycle. However, in accordance with the present disclosure, by maintaining a memory of the previous read cycle, only those tags which have actually changed are read in a given read cycle. The cost of reading the changed tags is linear in the number of tags which have changed and logarithmic in the total number of tags. This is due to the ability to compare the data received in the current read cycle with the data received in the previous read cycle. Since so few tags are changed, immense improvement is achieved in read cycle efficiency.

What is claimed is:

1. A method implementing a read cycle for identifying RFID tags among a plurality of RFID tags, each RFID tag having an identifier, the read cycle comprising:
   (a) selecting a first group of items for reading and, using an RFID reader, receiving identifiers from one or more items of the first group where at least two items appear in a single aggregate data instance at least once;
   (b) performing a first combined read using the received identifiers of the first group by summing values of an RF signal from multiple tags that have broadcast simultaneously in the same time slot to produce a collision;
   (c) storing the first combined read;
   (d) selecting a second group of items for reading and, using an RFID reader, receiving identifiers from one or more items of the second group, where the second group may or may not be different from the first group;
   (e) performing a second combined read using the received identifiers of the second group by summing values of an RF signal from multiple tags that have broadcast simultaneously in the same time slot to produce a collision;
   (f) comparing the first combined read with the second combined read without knowing a-priori connections between placement of different tags; and
      if the result of step (f) is within a margin, terminating the read cycle; or
      if the comparison is not within the margin, repeating steps (a) through (f) by forming at least one new group that may be a subset of the first group and
   (g) repeating steps (a) through (f) treating the at least one new group as the first group, and performing step (e) by adjusting the second group to exclude corresponding items of the first group that are not in the second group; and
   repeating through step (g) as required to determine what RFID tag of the first group has been added, modified or subtracted with respect to the first group.

2. The method of claim 1, wherein the at least one new group is formed by dividing the first group into at least two subgroups and running the read cycle for each subgroup.

3. The method of claim 1, wherein the repetition through step (g) is terminated when the identifier of a single item is received.

4. The method of claim 1, wherein each identifier is defined by a plurality of bits.

5. The method of claim 1, wherein the read cycle is performed in a time proportional to the number of tags that have changed and logarithmic in the total number of tags, where a change corresponds to new tags, removed tags, changed data or a new location.

6. The method of claim 1, wherein the number of reads is less than the number of tags read where tags are added and removed.

7. A method implementing a read cycle to identify RFID tags among a plurality of RFID tags, each RFID tag having an identifier, the read cycle comprising:
   forming at least two groups for reading of tags by selecting one or more values for the identifiers;
   performing a first combined read for a group using received identifiers from one or more tags of the group by summing values of an RF signal from multiple tags that have broadcast simultaneously in the same time slot to produce a collision wherein at least two tags are read in a single aggregate data instance at least once and determining an aggregate data of the received identifiers;
   comparing the combined read of the received identifiers with a combined read for the group from a previous read cycle, without knowing a-priori connections between placement of different tags; and
   where the compared combined reads is within a margin, determining that all tags of the first group have been identified and running the read cycle for another group; and
   where the compared combined reads is not within a margin, determining that the number or identity of tags of the first group has changed and repeating the read cycle by creating at least two new groups and running the read cycle for each new group.

8. The method of claim 7, where when the compared combined reads are not within a noise margin repeating the read cycle until at least one missing, added, or changed tag is identified.

9. The method of claim 7, wherein dividing a group into subgroups is performed by selecting a new value for the identifiers.

10. The method of claim 9, wherein selecting a value for the identifier includes selecting a value for a bit of the identifier.

11. The method of claim 7, further comprising reading all tags and storing the number of tags and their identifiers in a database prior to running a read cycle.

12. The method of claim 11, wherein the database of tags is updated after a read cycle.

13. The method of claim 7, wherein an RFID reader implements the read cycle.

14. The method of claim 7, wherein the read cycle is repeated till the identifier of a single tag is received.

15. The method of claim 7, wherein the read cycle is repeated till a subgroup includes a single changed tag.

16. The method of claim 7, wherein the number of reads is less than the number of tags read where tags are added and removed.

17. A tag reading apparatus for identifying RFID tags among a plurality of RFID tags, each tag having a tag identifier, the tag reading apparatus comprising:
   a receiver;
   a transmitter;
   a memory;
   a processor; wherein the processor is configured to run a read cycle comprising:
   (a) selecting a first group of items for reading and, using the tag reading apparatus, receiving identifiers from one or more items of the first group;
   (b) performing a first combined read using the received identifiers of the first group by summing values of an RF signal from multiple tags that have broadcast simultaneously in the same time slot to produce a collision;
   (c) storing the first combined read;
   (d) selecting a second group of items for reading and, using the tag reading apparatus, receiving identifiers from one or more items of the second group, where at least two tags appear in a same aggregate data instance at least once, and where the second group may or may not be different from the first group;
   (e) performing a second combined read using the received identifiers of the second group by summing values of an RF signal from multiple tags that have broadcast simultaneously in the same time slot to produce a collision;

(f) comparing the first combined read with the second combined read without knowing a-priori connections between placement of different tags; and if the result of step (f) is within a margin, terminating the read cycle; or if the comparison is not within the margin, repeating steps (a) through (f) by forming at least one new group that is a subset of the first group and (g) repeating steps (a) through (f) treating the at least one new group as the first group, and performing step (e) by adjusting the second group to exclude corresponding items of the first group that are not in the second group; and repeating through step (g) as required to determine what RFID tag of the first group has been added, modified or subtracted with respect to the first group.

18. The tag reading apparatus of claim 17, wherein the processor is configured to repeat the read cycle till a subgroup comprises of a single tag.

19. The tag reading apparatus of claim 17, wherein the processor is configured to select a group of tags by selecting a value for the identifiers.

20. The tag reading apparatus of claim 17, wherein the identifier is defined by a plurality of bits, the processor configured to select a group of tags by selecting a value for a bit of the identifiers.

21. The method of claim 17, wherein the number of reads is less than the number of tags read where tags are added and removed.

22. A tag reading apparatus for identifying RFID tags among a set of RFID tags, each tag having an identifier, the tag reading apparatus comprising:

an RFID reader wherein the reader is configured to execute a method implementing a read cycle, the read cycle comprising:

(a) selecting a group of items for reading and receiving identifiers from one or more items of the group where at least two tags appear in an aggregate data instance at least once;

(b) performing a combined read using the received identifiers by summing values of an RF signal in from multiple tags that have broadcast simultaneously in the same time slot to produce a collision;

(c) comparing the combined read with a combined read for the group from a previous read cycle, without knowing a-priori connections between placement of different tags; and (d) terminating the read cycle where the compared combined reads are within a margin or when the difference between the combined read using the received identifiers and the combined read for the group from a previous read cycle is the identifier of a new or modified item;

wherein the set of RFID tags includes commodity RFID tags that do not have a microcontroller and can also include RFID tags that have a microcontroller.

23. The method of claim 22, wherein the number of reads is less than the number of tags read where tags are added and removed.

24. A method implementing a read cycle for reading data among a plurality of items, each item having data, the read cycle comprising:

(a) selecting a first group of items for reading and, using an item reader, receiving data from one or more items of the first group;

(b) performing a first combined read using the received data of the first group by summing values of an RF signal from multiple tags that have broadcast simultaneously in the same time slot to produce a collision;

(c) storing the first combined read;

(d) selecting a second group of items for reading and, using an item reader, receiving data from one or more items of the second group where communication of at least two items overlap in time at least once, where the second group may or may not be different from the first group;

(e) performing a second combined read using the received data of the second group by summing values of an RF signal from multiple tags that have broadcast simultaneously in the same time slot to produce a collision;

(f) comparing the first combined read with the second combined read without knowing a-priori connections between placement of different tags; and if the result of step (f) is within a margin, terminating the read cycle; or if the comparison is not within the margin, repeating steps (a) through (f) by forming at least one new group and (g) repeating steps (a) through (f) treating the at least one new group as the first group, and performing step (e) by adjusting the second group to exclude corresponding items of the first group that are not in the second group; and repeating through step (g) as required to determine what item of the first group has been added, modified or subtracted with respect to the first group.

25. The method of claim 24, wherein the number of reads is less than the number of tags read where tags are added and removed.

26. A method of implementing a read cycle for reading RFID tags among a plurality of RFID tags in which a device that reads the RFID tags may move, each RFID tag having an identifier, the read cycle comprising:

(a) dividing the plurality of RFID tags for reading into a set of groups;

(b) taking a combined read for each group by summing values of an RF signal from multiple tags that have broadcast simultaneously in the same time slot to produce a collision, measured for a geographical overlap of the range of the device reader where communication of at least two tags overlaps in time at least once, wherein if none of the RFID tags in the combined read change, the difference in the combined read will solely be dependent on the change in location of the reader;

(c) taking a shadow combined read for each group, measured for the geographical overlap of the range of the device reader;

(d) for each group, comparing the difference of the combined read and the shadow combined read;

(e) determining that an item has changed when the difference between any of the combined reads and the shadow combined reads is not within a noise factor;

wherein a changed RFID tag is one where a tag has been added, subtracted, or moved its location.

27. The method of claim 26, wherein the number of reads is less than the number of tags read where tags are added and removed.

28. The method of claim 26, wherein step (d), for each group, comparing the difference of the combined read and the shadow combined read, is done without knowing a-priori connections between placement of different tags.

* * * * *